Jan. 22, 1924.　　　　　　1,481,436
E. F. RUSSELL ET AL
THRASHING MACHINE
Filed Aug. 28, 1922　　　3 Sheets-Sheet 3
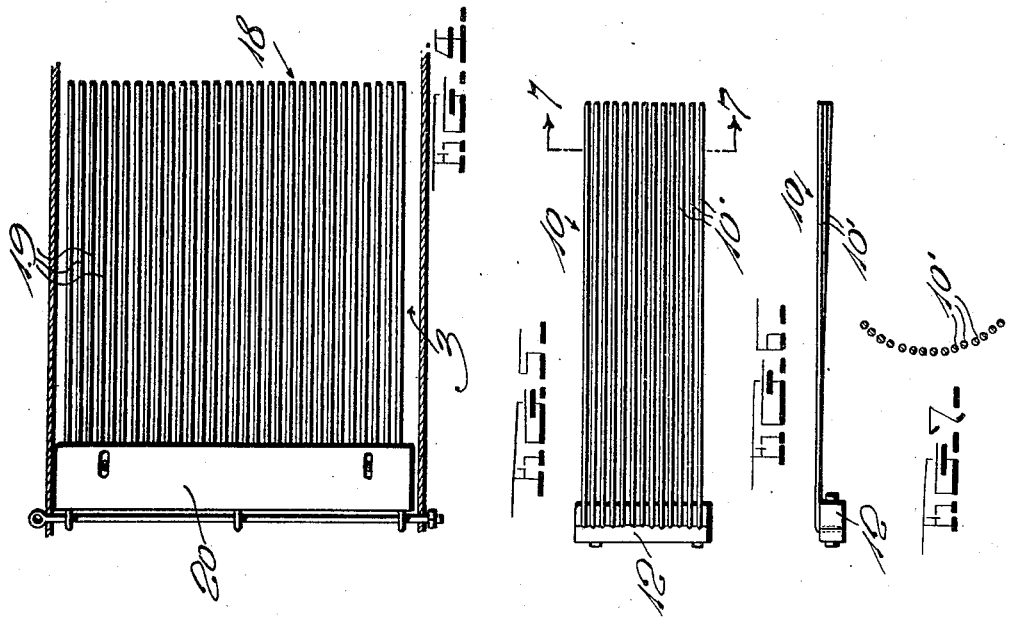
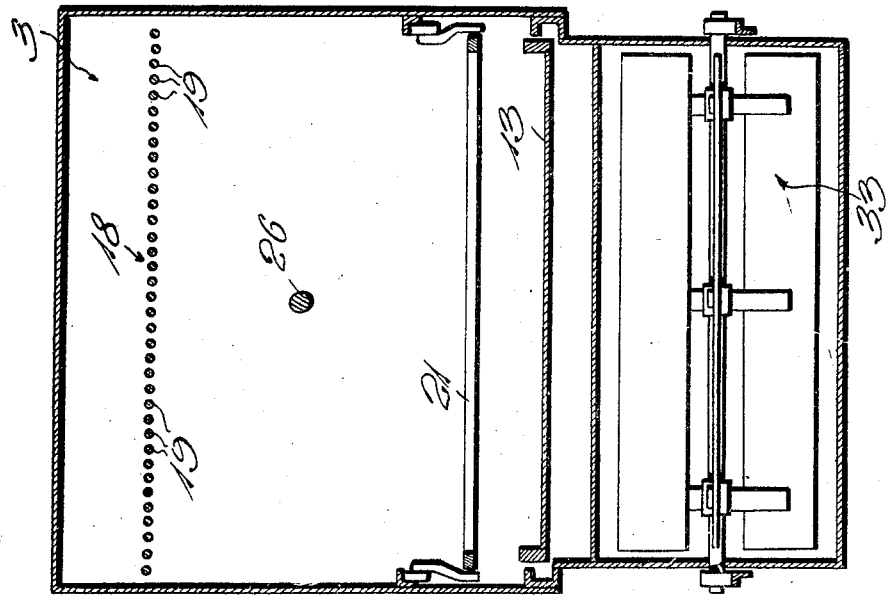
Witness
H. Woodard
Inventors
EARL F. RUSSELL
RAYMOND B. LAMME
By H. B. Wilson & Co.
Attorneys Patented Jan. 22, 1924.

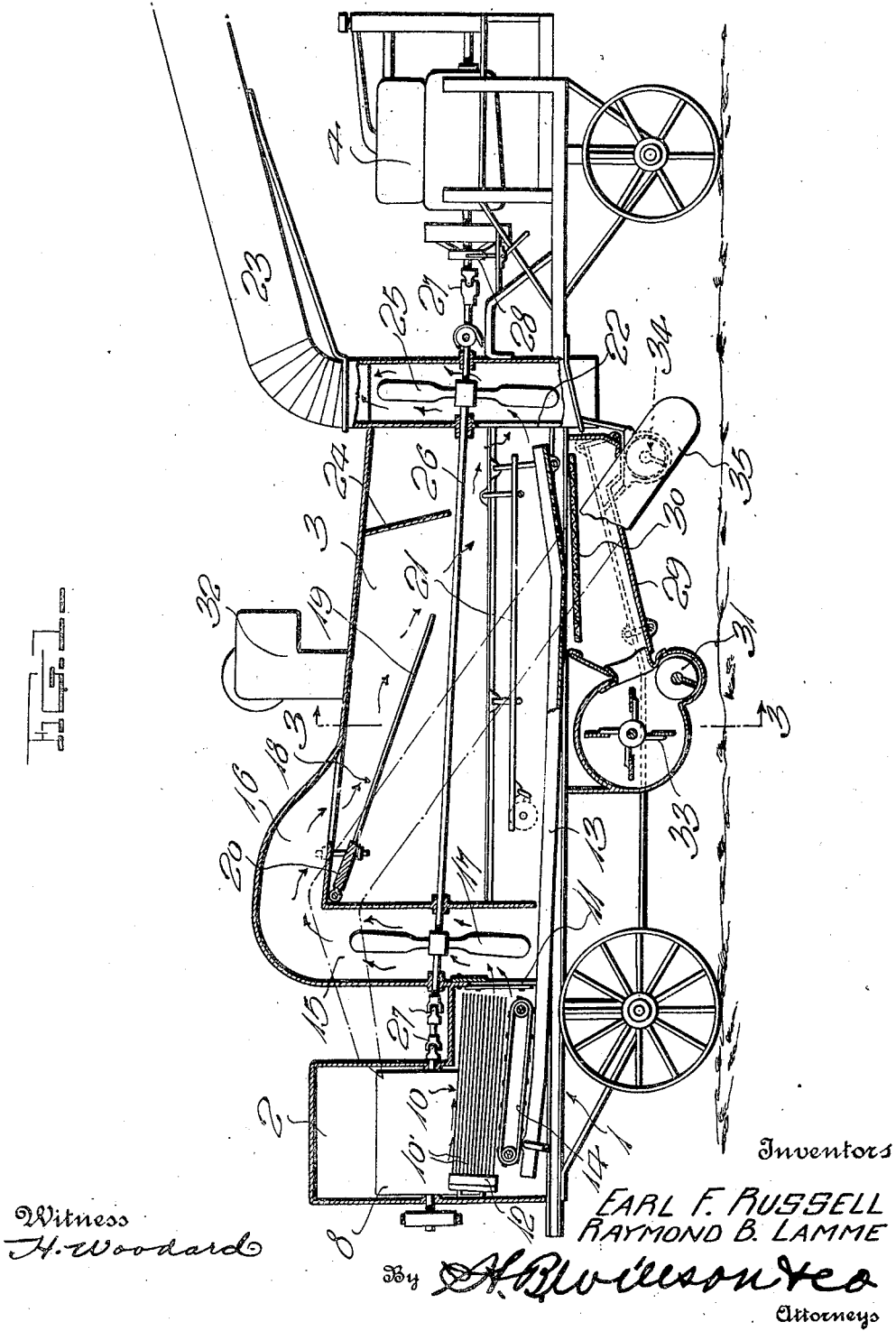

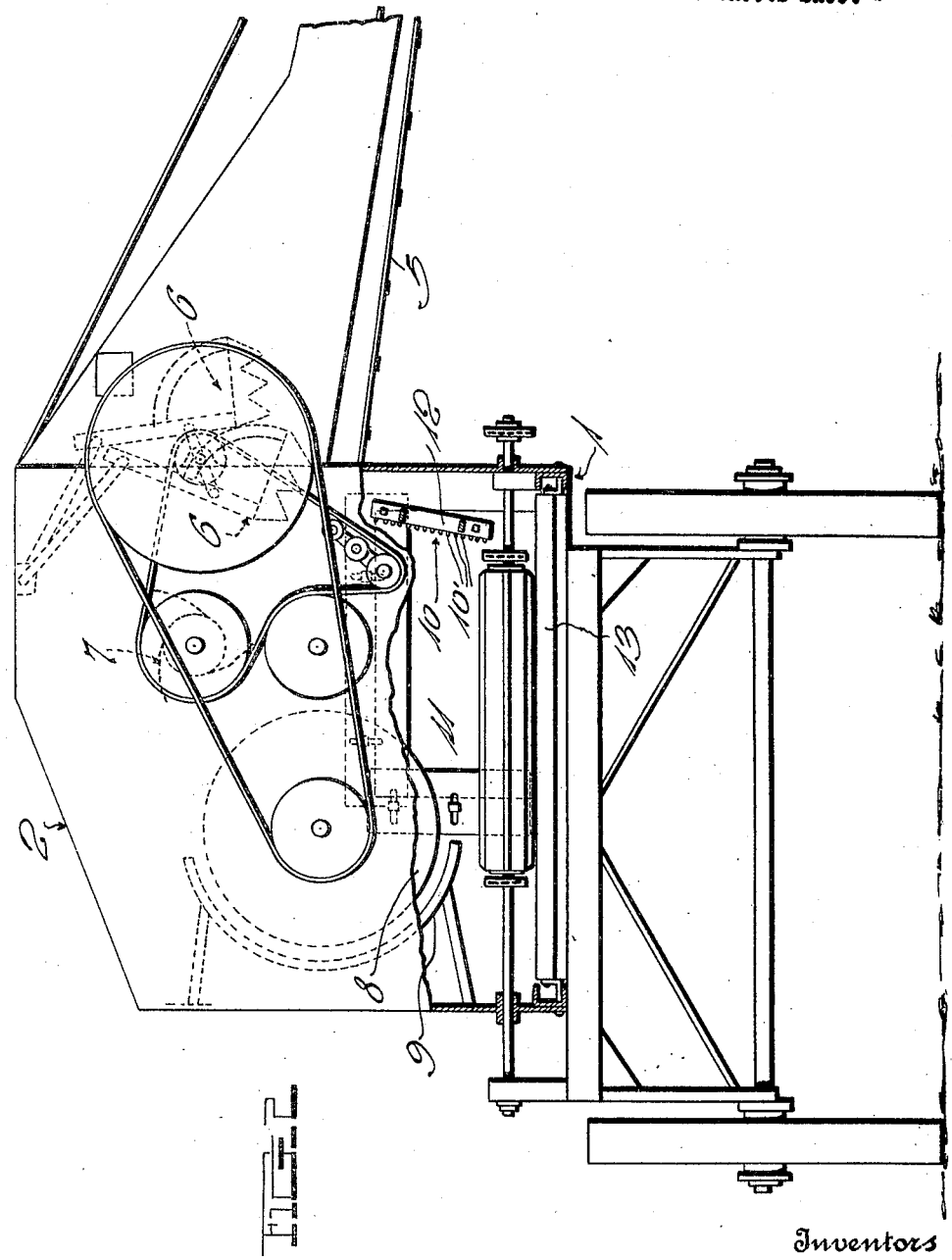

1,481,436

UNITED STATES PATENT OFFICE.

EARL F. RUSSELL, OF BIRD CITY, KANSAS, AND RAYMOND B. LAMME, OF ULYSSES, NEBRASKA.

THRASHING MACHINE.

Application filed August 28, 1922. Serial No. 584,771.

*To all whom it may concern:*

Be it known that we, EARL F. RUSSELL and RAYMOND B. LAMME, citizens of the United States, residing, respectively, at Bird City and Ulysses, in the counties of Cheyenne and Butler and States of Kansas and Nebraska, have invented certain new and useful Improvements in Thrashing Machines; and we do declare the following to be a full, clear, and exact description of the invention, such as will enable others skilled in the art to which it appertains to make and use the same.

Our invention relates to improvements in grain separators and more particularly to those designed primarily for use in connection with thrashing machines, one object being to provide an open-work wall against which the grain and straw are thrown by the thrashing mechanism, the straw being checked by this wall and carried from the thrashing chamber while some of the threshed grain passes through the wall and is caught in a grain pan.

The straw discharged from the thrashing chamber carries quite an amount of grain and a further aim is to provide the main separating chamber of the machine with an open-work inclined screen upon which this grain-laden straw is discharged by an air blast. By this means, the grain is forced from the straw while the latter is moved along the screen by the air blast producing effective operation before the straw is discharged onto the reciprocating straw rack.

A further aim is to provide for driving a fan for producing the above mentioned air blast as well as a stacking fan, from a single longitudinal shaft which is preferably driven by an engine on the frame of the machine.

Yet another object is to provide a simple and inexpensive, yet an efficient and desirable machine which, by the mere addition of a grain header, may be readily converted into a combined harvesting and thrashing machine.

With the foregoing in view, the invention resides in the novel subject matter hereinafter described and claimed, the description being supplemented by the accompanying drawings.

Figure 1 is a longitudinal sectional view of the improved thrashing machine.

Figure 2 is an end view thereof, parts being shown in section.

Figure 3 is a transverse section taken on line 3—3 of Fig. 1.

Figure 4 is a plan view of a separating screen used on the improved thrashing machine.

Figure 5 is a side elevation of another separating screen.

Figure 6 is an edge view thereof.

Figure 7 is a transverse section taken on line 7—7 of Fig. 5.

In the drawings above briefly described, the numeral 1 designates an appropriate wheel supported frame upon which is mounted a thrashing chamber 2, a main separating chamber 3, an engine 4, and all working parts driven from this engine. The grain to be threshed is fed in one side of the thrashing chamber 2, by an appropriate feeder 5 including a plurality of kickers 6 which feed the unthreshed grain to band cutters 7, in the construction here shown. It will be understood however that the band cutters are not necessary in all instances and that the feeding means may be of any conventional or desired type. We prefer however to use an over-shot cylinder 8 in the thrashing chamber 2 and to arrange the concave 9 which co-acts with said cylinder, in such a manner that the straw will be discharged horizontally as indicated by the arrows in Fig. 1. A substantially vertical open-work wall 10 extends across the lower portion of the thrashing chamber 2, parallel with the axis of the cylinder 8 and leads to one edge of an adjustable opening 11 by means of which the chamber 2 communicates with the main thrashing chamber 3. The wall 10 is by preference formed of a plurality of vertically spaced horizontal rods 10' secured at one end to a suitable post 12 while their other ends are free adjacent the opening 11, so as to interfere in no manner with passage of straw through said opening. These free ends of the rods are by preference offset slightly from each other so as to impart a transverse curvature to the wall 10 at its delivery end.

The grain laden straw is checked by the wall 10 while some of the grain passes through said wall into the reciprocating grain pan 13, and the straw caught by the wall is carried by a conveyor 14 from the chamber 2 through the opening 11 into a blower or fan casing 15 at one end of the separating chamber 3. The outlet 16 from this casing discharges the grain laden straw into the upper portion of the separating chamber 3 in an inclined direction, a suitable fan 17 being located in the casing so that the straw and grain are discharged through the outlet 16 with considerable air pressure. This pressure drives the grain and straw downwardly upon an inclined screen 18 which is mounted in the upper portion of the chamber 3, being preferably formed by a plurality of rods 19 free of connection to each other at their lower ends and all mounted on a common support 20 at their upper ends. As the straw leaves the outlet 16 of the casing 15 and is caught upon the screen 18, it spreads out into a thin film or layer upon this screen, permitting the grain to be driven by the air pressure through the screen so that it will eventually be caught in the grain pan 13. In view of the fact that the screen 19 is inclined in substantially the same manner but to a less extent than the direction taken by the straw and grain discharged from the outlet 16, the air pressure will serve to move the straw continuously along the screen and this straw will discharge onto a suitable reciprocating straw rack 21, by which it is fed to the inlet opening 22 of a pneumatic stacker casing 23, an inclined baffle 24 being preferably provided between the screen and casing beneath which the straw must travel. The stacker fan 25, the fan 17, and the thrashing cylinder 8 may all be driven by a common longitudinal shaft 26 having suitable universal joints 27 where necessary, and this shaft is driven by the engine 4 through the instrumentality of a suitable clutch 28. All moving parts of the machine may be driven by belts or the like operated from the shaft 26 or otherwise driven from the engine 4, but as such details are left to mechanical skill in constructing the machine, they will not be specifically described.

The numeral 29 designates a reciprocating shoe under the delivery end of the grain pan 13 and provided with a screen 30 onto which the grain and any chaff which may remain therewith, are discharged. The grain passes through the screen and is intended to slide down the inclined bottom of the shoe 29 into a transverse worm conveyor 31 which leads beneath the machine to the usual grain elevator 32. As the grain falls from the screen 30, it encounters a blast of air from a blower 33 and this blast carries any remaining chaff and dust into a transverse worm conveyor 34 leading to a chaff elevator 35 which preferably returns to the thrashing chamber 2. Thus, if any grain remains with the chaff, it will be again subjected to a separating operation.

In actual practice, excellent results have been obtained from the general construction shown and described and we therefore prefer that this construction shall be followed. It is to be understood however that within the scope of the invention as claimed, numerous minor changes may be made.

We claim:

1. A thrashing machine comprising a chamber and means therein for thrashing grain from straw, a wall of open-work form in said chamber through which the grain is thrown by the thrashing means and by which the straw is checked, receiving means for the grain, and means between the thrashing means and wall for carrying the checked straw from the chamber.

2. A thrashing machine comprising a chamber and means therein for thrashing grain from straw, a vertical wall of openwork form in said chamber through which the grain is thrown by the thrashing means and by which the straw is checked, receiving means for the grain, and a driven conveyor between the wall and thrashing means on which the straw checked by said wall is caught to be carried from the chamber.

3. A thrashing machine comprising a chamber, an overshot cylinder and a concave in said chamber, a vertical wall of openwork form in said chamber positioned substantially parallel with the cylinder axis in the path of the threshed grain and straw discharged by the cylinder and concave, whereby to check the straw while permitting the grain to pass, means for receiving the grain, and means between the thrashing means and wall for carrying the checked straw from the chamber.

4. A thrashing machine comprising a grain thrashing and initial separating chmber, a main separating chamber, a straw and grain passage from said initial to said main separating chamber, a fan in said passage, a straw outlet from said main separating chamber, a fan in said outlet, and a common driving shaft carrying both fans.

In testimony whereof we have hereunto affixed our signatures.

EARL F. RUSSELL.
RAYMOND B. LAMME.